March 14, 1967  M. A. GALIN  3,308,810
DEVICE FOR APPLYING SUCTION TO THE EYE AND METHOD
FOR TREATING THE EYE BY USING SUCH DEVICE
Filed Feb. 17, 1965                                                      5 Sheets-Sheet 1

INVENTOR.
MILES A. GALIN
BY
his ATTORNEYS

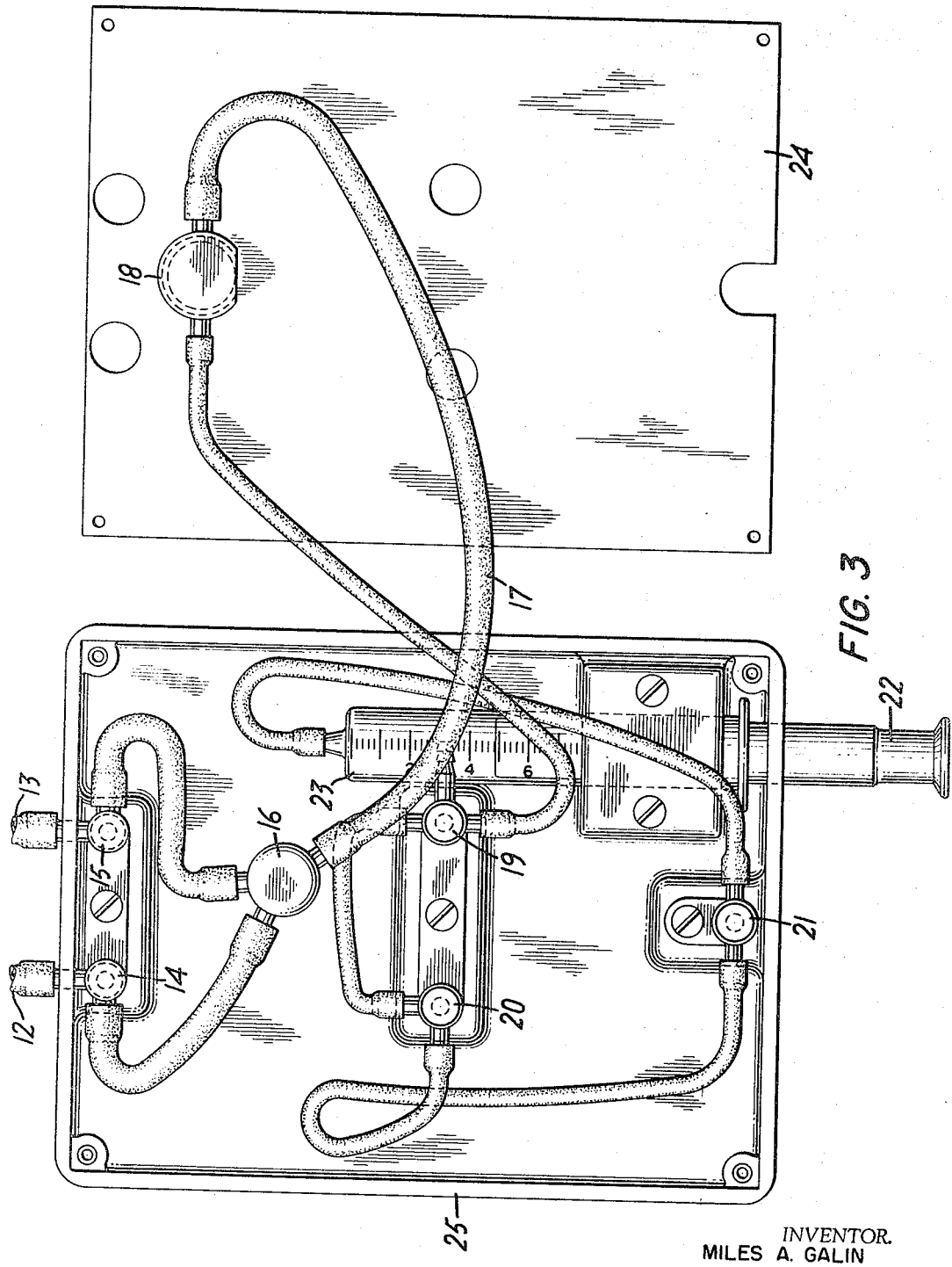

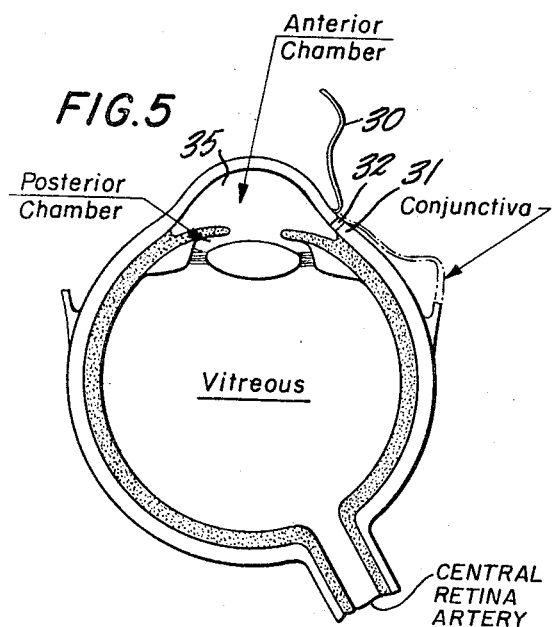
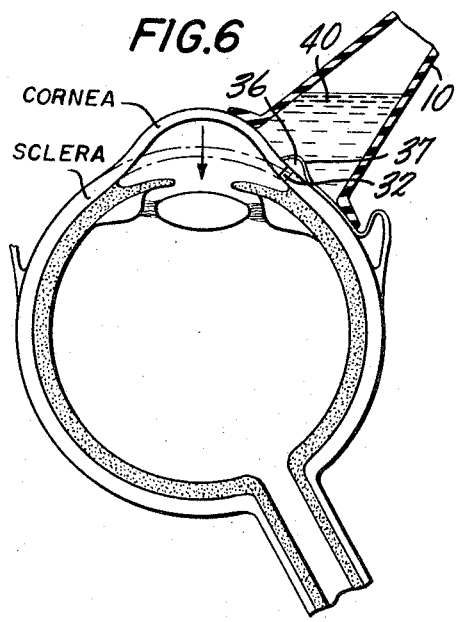
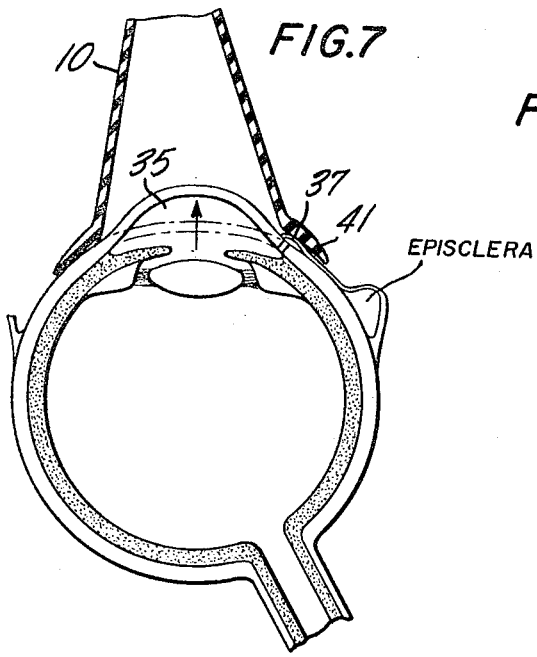
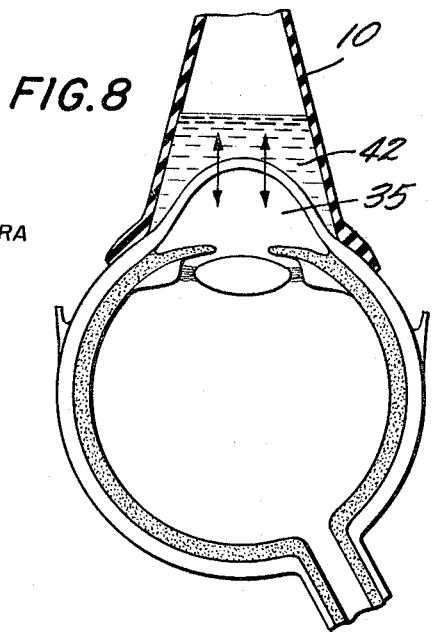

March 14, 1967                 M. A. GALIN             3,308,810
DEVICE FOR APPLYING SUCTION TO THE EYE AND METHOD
FOR TREATING THE EYE BY USING SUCH DEVICE
Filed Feb. 17, 1965                                     5 Sheets-Sheet 5

INVENTOR.
MILES A. GALIN
BY
his            ATTORNEYS

United States Patent Office 3,308,810
Patented Mar. 14, 1967

3,308,810
DEVICE FOR APPLYING SUCTION TO THE EYE AND METHOD FOR TREATING THE EYE BY USING SUCH DEVICE
Miles A. Galin, New York, N.Y., assignor to Theratronic Corp of America, New York, N.Y., a corporation of New York
Filed Feb. 17, 1965, Ser. No. 436,719
12 Claims. (Cl. 128—2)

This invention relates to improvements in optical diagnostic tools and surgical devices characterized by pneumatic pressure control over the episcleral and intrascleral venous plexus.

This application is a continuation-in-part of United States application Ser. No. 182,587, filed Mar. 26, 1962, now abandoned.

It is of considerable medical importance to know the rate of secretion of aqueous humor from the human eye. As an aid to glaucoma diagnosis it is useful to temporarily close the canal system through which the aqueous humor drains into the episcleral veins until intraocular pressure increases slightly. The rate at which the intraocular pressure decays following the reopening of the canal system and the resumption of aqueous humor drainage into the episcleral veins provides valuable information for glaucoma analysis.

Furthermore, during eye operations careful restraint of eye movement is extremely important.

Present devices capable of applying an acceptable suction to the surface of the eye for diagnostic or surgical purposes utilize differing heights of mercury or water columns to achieve a satisfactory vacuum. This manometric method is difficult to operate, cumbersome, and uses easily breakable glass and toxic mercury. Mechanical devices, not relying on manometric techniques lack fine vacuum control.

It is an object of this invention to provide a closely controlled pneumatic means for closing the canal system through which aqueous humor drains into the episcleral veins.

Another object of the present invention is to provide an improved vacuum control means restraining eyeball movement during surgical operations.

A further object of the invention is to provide a diagnostic tool useful in glaucoma analysis.

A further object is to provide an instrument and procedure useful for the measurement of central retinal artery pressure.

Another object is to develop an instrument which will produce suction or negative pressure which can then be delivered smoothly and accurately to various types of applicators which can be placed on the eye.

Other objects and advantages of the invention will be apparent from one embodiment of the invention illustrated by the following description in conjunction with the accompanying drawings, in which:

FIGURE 3 is a front view of the suction controls with the cover plate removed;

FIGURE 5 is a cross-sectional view of the human eye showing the conjunctiva partly removed in accordance with operative procedures;

FIGURE 6 is also a cross-sectional view of the eye showing a cup placed over an operative bleb in the perilimbal section of the eye;

FIGURE 7 is a cross-sectional view of the eye and of the cup placed perilimbally over the cornea of the eye;

Figure 9:
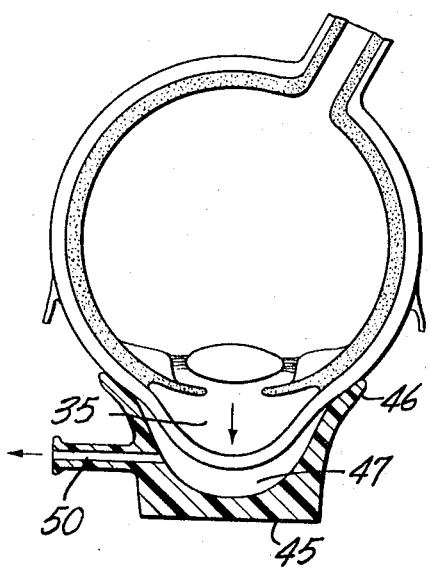
Figure 10:
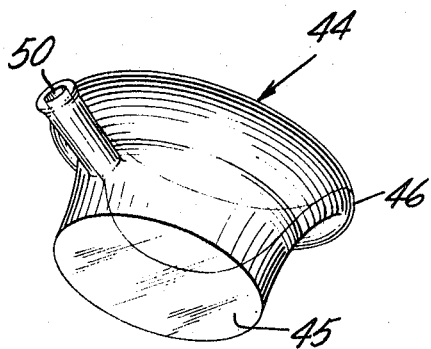

FIGURE 8 also shows the cup placed perilimbally over the cornea of the eye in accordance with certain procedures of the present invention;

FIGURE 9 shows a certain type of cup placed perilimbally over the cornea of the eye in accordance with certain procedures of the present invention; and FIGURE 10 is an isometric view of the cup shown in FIGURE 9.

Suction on the limbal portion of the human eye is created by means of the present invention in an amount sufficient to prevent eye movement during operations or to close the canals draining aqueous humor into the episcleral veins for the purpose of glaucoma analysis. It can be delivered smoothly and accurately to various types of applicators placed on the eye.

By applying pressure on selected parts of the eye certain physiological processes can be interrupted and also measured. The intraocular pressure can be elevated or diminished selectively. The rate of formation and outflow of aqueous humor can be measured.

With other modifications the device may also be used to collect intraocular fluids such as aqueous without the necessity for needle punctures in the eye.

The instrument can also be utilized for directly measuring the blood pressure within the arteries of the retina.

A plurality of valves and vacuum chambers create a low pressure reservoir. The valves further provide means whereby the vacuum in the system can be easily adjusted to a satisfactory level for safe application to the limbal area of the eye. Thus, the present invention provides a safely adjustable device, suitable for imposing a selected pressure on the human eye without requiring the use of easily breakable or toxic materials.

Figure 2:
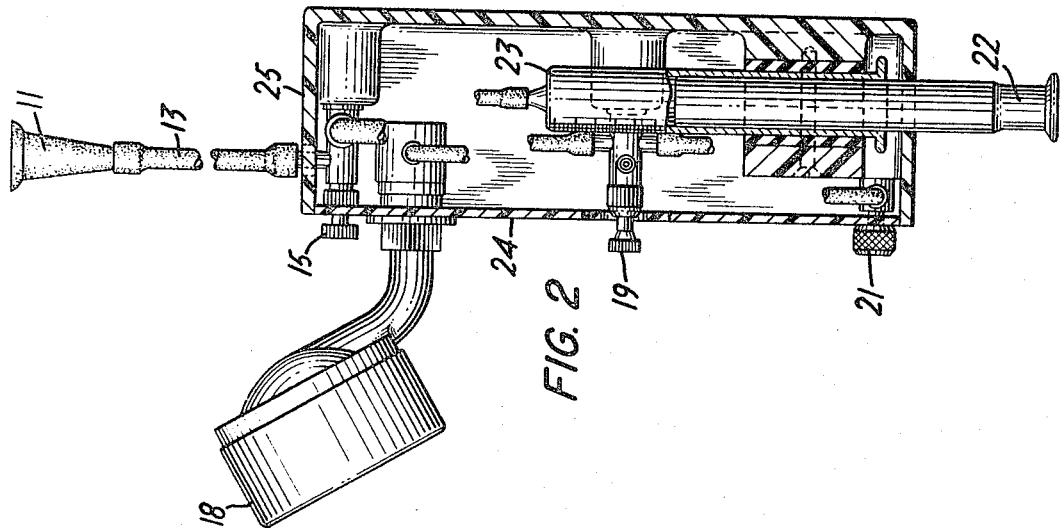
FIGURE 2 is a side view of the invention taken along the plane represented by line 2—2 in FIGURE 1 and looking in the direction of the arrows.
Figure 1:
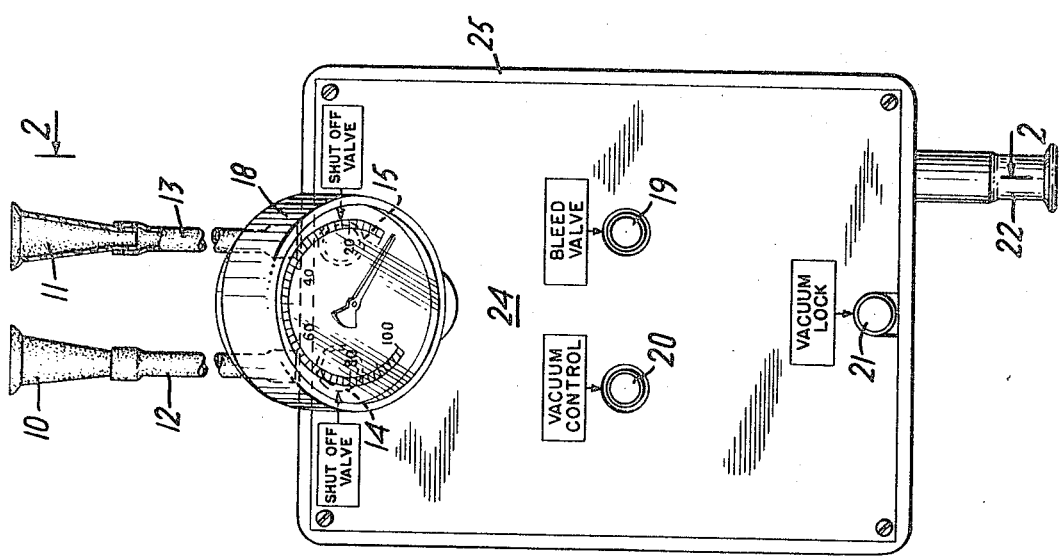
FIGURE 1 is a front view of the aneroid sensing device according to the invention.
Figure 4:
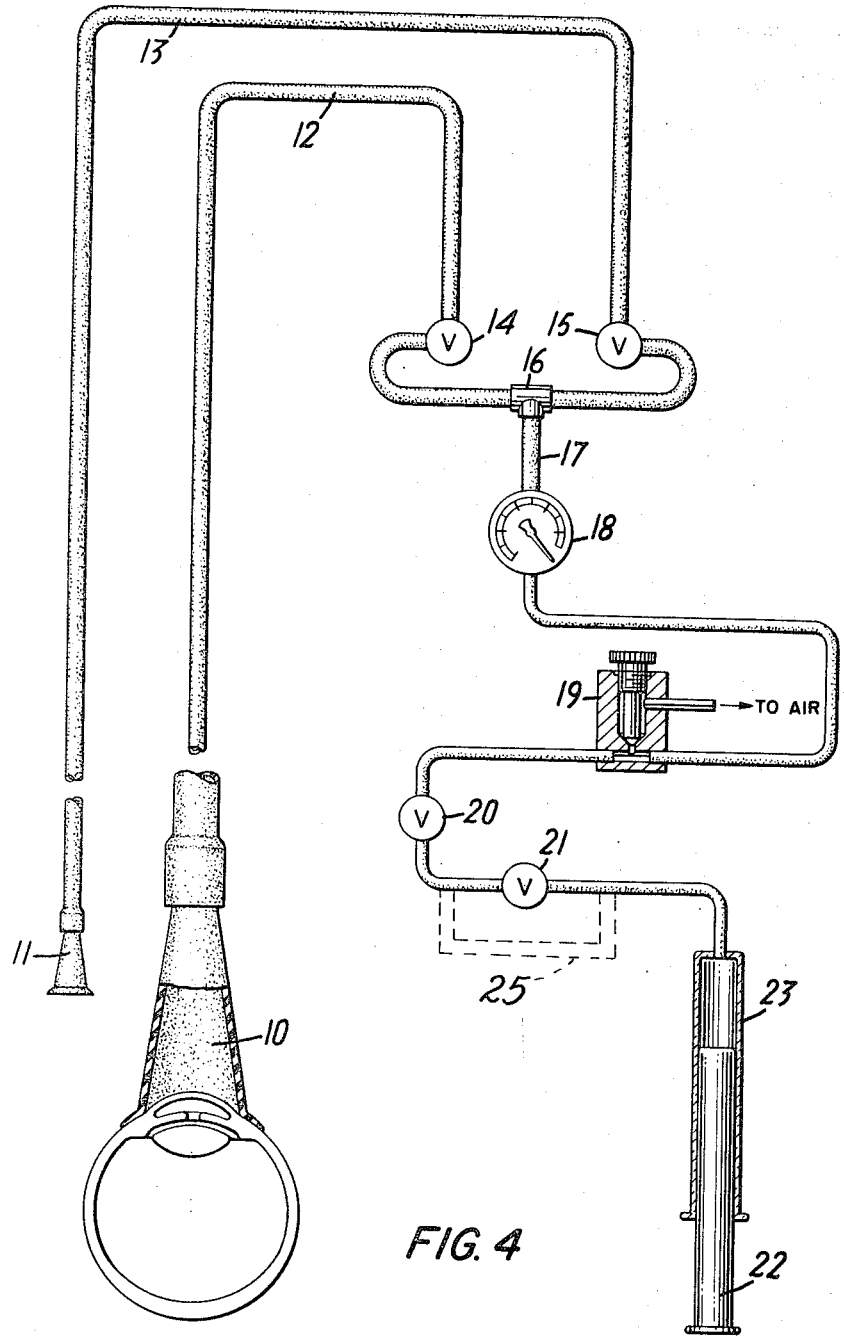
FIGURE 4 is a schematic diagram of the suction control apparatus (one eye only being shown)

Referring to FIGURES 3 and 4 of the accompanying drawings, two perilimbal suction cups 10 and 11 are attached to two suction chambers 12 and 13 conveniently illustrated here in the form of flexible tubes, which are interrupted by two shut-off valves 14 and 15. These suction chambers 12 and 13 are conveniently joined at a T-connection 16 to form a single vacuum chamber or reservoir 17, also represented in the form of a flexible tube. A pressure gage 18 conveniently illustrated as an aneroid gage, but which can be any satisfactory pressure measuring device, and a bleed valve 19 are fitted to the vacuum chamber 17. The bleed valve 19 permits air to be bled into the vacuum chamber 17 in graduated amounts. The vacuum chamber 17 is further provided with a vacuum control valve 20 and a vacuum lock valve 21. As indicated in FIGURE 4, in one embodiment of the invention, the vacuum lock valve may be omitted (as shown by the by-pass tube 25' in dotted lines).

Vacuum is established through the entire system by means of a piston 22 drawn down from top dead center within a cylinder 23. Of course, it is understood that any suitable source of vacuum could be used. A cover plate 24 is provided for the valve and cylinder assembly. The entire valve and cylinder assembly is mounted within a rectangular box 25 which suitably protects the mechanism from deterioration and damage.

In operation, the shut-off valves 14 and 15 or some equivalent means of chamber interruption, the bleed valve 19, and the vacuum control valve 20 are closed while the vacuum lock valve 21 is opened. The piston is withdrawn to create a vacuum within the vacuum chamber between valves 20 and 21. When a satisfactory vacuum is created the vacuum lock valve 21 is closed and the piston 22 is returned to top dead center.

The vacuum control valve or reservoir closure means 20 is opened, decreasing the pressure in the entire vacuum chamber 17. To preserve a residual amount of vacuum for further pressure adjustments, the means of vacuum control, valve 20 is closed.

When operating with the vacuum lock valve open at all times (or with the by-pass 25') the vacuum drawn by the piston-cylinder 22–23 is similarly transmitted to the vacuum chamber 17 by opening the valve 20 and adjusting the vacuum with the bleed valve 19 as read on the gage 18.

A perilimbal suction cup 10 is placed on the limbal section of the eyeball and the shut-off means, valve 14 is opened. If an undesirably excessive pressure exists in the system, the vacuum control valve 20 can be opened once more to decrease this pressure. Excessive vacuum can be reduced to a satisfactory pressure by opening the bleed valve 19. To release completely the suction cup 10 from the eyeball, the bleed valve 19 can be opened until the vacuum within the system has been entirely dissipated.

Should it be desirable to use both suction cups simultaneously, the valves or chamber interruption or closure means 14, 15, 19 and 20 should be closed while the means of vacuum lock, 21, remains open. The piston 22 is drawn down from top dead center in the cylinder 23 and the vacuum lock valve 21 is closed. The piston 22 is returned to top dead center within the cylinder 23.

The vacuum control valve 20 is opened, reducing the pressure in the vacuum reservoir or chamber means 17. The vacuum control valve 20 is then closed. Vacuum chamber pressure may be raised, if required, by opening the means of vacuum bleed 19.

Suction cups 10 and 11 are placed over the limbal areas of both eyes and shut-off valves 14 and 15 are opened. If it is necessary to further depress the system pressure, vacuum control valve 20 may be opened again. However, should the system pressure be too low, a controlled increase in pressure can be accomplished by opening the bleed valve 19. Such procedures may also be carried out using the apparatus including the open by-pass 25', in a manner indicated above.

When removal of the suction cups 10 and 11 is desired, the bleed valve 19 is opened and the vacuum within the system is entirely dispelled. The suction cups 10 and 11 can then easily be removed.

The surgical treatment of glaucoma frequently requires a fistulating procedure. This consists of reflecting forward a flap of conjunctiva 30 as shown in FIGURE 5 to expose the corneo-scleral limbus 31. A portion of this tissue is then excised or cauterized to form a channel 32 between the interior chamber 35 and the subconjunctival space 36 as shown in FIGURE 6. Aqueous may then pass through the conjunctiva replaced to its normal position as shown in FIGURE 6, and be removed with the tears. This penetration of the aqueous through the conjunctiva takes place by diffusion through the conjunctiva as a semi-permeable membrane. A successful operation will result in the formation of a bleb ("blister") 37 in the conjunctiva overlying the fistula or channel 32 in the corneo-scleral wall 31.

Certain patients will produce excessive scarring and will develop blebs which are not thin or porous enough to allow aqueous to pass through them. The suction cup device is then used to lift the bleb 37, as shown in FIGURE 6, and to force aqueous through it, which then collects at 40, as shown in FIGURE 6. In this procedure the suction cup is placed eccentrically on the cornea so that the bleb lies within the center of the aperture. Fifty millimeters of mercury suction is then introduced into the cup by means of the aneroid suction device according to the procedures described above. This increases the intraocular pressure forcing aqueous into and through the bleb 37. The negative pressure on the external surface of the bleb further increases the movement of aqueous. Repeated use of this technique over a period of time results in permanent improvement of the bleb and its ability to handle the elimination of aqueous from the eye. Such procedure is very desirable in the treatment of glaucoma.

The aqueous which enters the cup and is collected at 40, as shown in FIGURE 6, may also be collected and utilized as a sample for analysis. In fact, the cup so placed may be used to extract aqueous from the eye through the perilimbal area without the need for forming the fistula or channel 32. This allows the collection of intraocular fluids from the human eye without the necessity for penetrating the organ with a needle or cannula.

In certain cases following the type of surgery described above, the flow of aqueous through the bleb is too great, causing the anterior chamber 35 to remain flattened. The suction cup can be used to treat this condition by placing the flange 41 of the cup directly over the bleb 37 as shown in FIGURE 7 and introducing a small amount of negative pressure into the cup 10. This collapses the bleb and allows a normal production of aqueous to reform the anterior chamber as indicated by the arrow in FIGURE 7.

This specially designed cup 10 and procedure indicated in FIGURE 8 and the suction system permit the placement of medicament in the fluid phase into the cup. When the cup is placed about the limbus, as shown in FIGURE 8, the transfer of fluid 42 into the eye is enhanced and the equilibrium between the concentration of medicament in the cup and the anterior chamber 35 is approached. It will be observed that this procedure can take place without the need for forming a fistula or channel through the corneo-scleral wall.

The aneroid suction device of the present invention, with specially designed suction cups, can also be used for measuring the pressure within the central retinal artery. Suction can be produced either by the syringe mechanism shown in FIGURE 4 at 22 and 23, or by way of servo-mechanism motors or by the use of an electric vacuum pump. One type of cup illustrated in FIGURE 10 may be made of plastic, glass or other optically clear substance. The front surface 45 is ground to a plane so that observations of the central retinal artery at the optic disc may be made through the cup with a slit lamp or biomicroscope as well as with the ophthalmoscope. The cup is placed perilimbally over the eye as shown in FIGURE 9 and as suction is increased by the aneroid suction device, the intraocular pressure rises. The central retinal artery at the optic disc is kept under observation with the ophthalmoscope. When the intraocular pressure just exceeds the diastolic pressure within the central retinal artery, pulsations will be seen within the artery. The amount of suction needed to achieve this intraocular pressure is noted; suction is now increased thus increasing the intraocular pressure. When the intraocular pressure just exceeds the systolic pressure within the central retinal artery, pulsations within the artery will cease and the artery will be emptied. The amount of suction necessary to achieve this intraocular pressure is noted.

Using a calibration table, the suction values can be translated into millimeters of mercury of intraocular pressure and the pressure within the central retinal artery can thus be determined in millimeters of mercury.

The calibration tables are derived experimentally on a large group of people by utilizing this suction cup and an aneroid suction device. When the cup in place the suction is increased step-wise and the intraocular pressure measured for each step with the applanation or other tonometer.

The cup 44 shown in FIGURE 10 and in cross-section in FIGURE 9 has a circular flange 46 adapted to fit the perilimbal area surrounding the cornea of the eye. It also has a dish or bowl-shape interior 47 adapted to provide a space between the exterior of the cornea and the interior of the bowl-shaped chamber 47. Communicating with the chamber 47 is a channel or tube 50 which is adapted to fit a connecting tube 12 or 13 such as that shown in FIGURE 4. By virtue of the planar surface 45 and the transparency of the material, it is possible to see directly through the cup and the eye and observe the effect of the procedures described on the interior portions of the eye.

As is apparent from the foregoing, the invention provides an aneroid sensing device which is extremely useful in optical surgery and diagnosis, providing ease of adjustment, portability and simplicity.

While a representative embodiment of the present invention has been shown and described for purposes of illustration, various changes and modifications may be made therein by those skilled in the art without departing from the principles of this invention. Therefore, all such changes and modifications are included within the intended scope of the invention as defined by the following claims.

I claim:
1. A device for optical use comprising:
   a suction cup compatible with the limbal area of the eye,
   a suction tube adapted to be in free communication with said suction cup,
   a first valve freely communicating with and selectively interrupting said suction tube,
   a vacuum tube adapted to communicate with said suction tube and said valve,
   a pressure gage in free communication with the vacuum tube,
   a vacuum lock valve adapted to selectively terminate said vacuum tube,
   a bleed valve adapted to be operatively interposed in said vacuum chamber between said vacuum lock valve and said first valve for the selective reduction of the vacuum therein, and
   means for generating a partial vacuum operatively communicating with said vacuum lock valve and said vacuum chamber for the establishment of a vacuum therein,
   whereby a vacuum may be generated and controlled in said vacuum tube by said vacuum generating means while said first valve is closed and at least part of said controlled vacuum may be transmitted through said suction tube to the eye by opening said first valve after said cup is placed against the eye.

2. A device for optical diagnosis and operations comprising:
   a suction cup compatible with the limbal area of the eye,
   a suction chamber adapted to be in free communication with said suction cup,
   a first valve operatively communicating with and selectively interrupting said suction chamber,
   a vacuum chamber adapted to communicate with said suction chamber and said first valve,
   a valve adapted to selectively terminate said vacuum chamber,
   a vacuum control valve operatively connected to said vacuum chamber between said first valve and said valve terminating said vacuum chamber to provide a vacuum reservoir between said vacuum control valve and said terminating valve,
   a bleed valve adapted to be operatively interposed in said vacuum chamber between said vacuum control valve and said first valve for the selective reduction of the vacuum therein, and
   means for generating a partial vacuum operatively communicating with said valve adapted to terminate said vacuum chamber,
   whereby a partial vacuum may be generated and controlled in said vacuum chamber by said partial vacuum generating means while said first valve is closed and at least part of said controlled vacuum may be transmitted through said suction chamber to the eye by opening said first valve after said cup is placed against the eye.

3. A device for optical use comprising:
   suction cup means compatible with the limbal and scleral areas of the eye,
   suction chamber means communicaitng freely with said suction cup means to establish a vacuum therein,
   shut-off valve means operatively connected to said suction chamber means for the selective termination of said suction chamber means,
   vacuum chamber means in free communication with said shut-off valve means and said suction chamber means for the selective establishment of a vacuum therein,
   vacuum lock valve means operatively connected to said vacuum chamber means for the selective termination of said vacuum chamber,
   bleed valve means communicating with said vacuum chamber means to selectively dissipate the vacuum within said vacuum chamber means,
   vacuum control valve means operatively connected to and selectively interrupting said vacuum chamber means between said bleed valve and said valve terminating said vacuum chamber to provide a vacuum reservoir between said vacuum control valve means and said vacuum lock valve means,
   pressure gage means in communication with said vacuum chamber means between said shut-off valve means and said vacuum control valve for the measurement of the vacuum therein, and
   vacuum generation means operatively communicating with said vacuum lock valve means and said vacuum chamber for the removal of air therefrom,
   whereby a vacuum may be generated and controlled in said vacuum chamber means by said vacuum generation means while said shut-off valve means is closed and at least part of said controlled vacuum may be transmitted through said suction chamber to the eye by opening said shut-off valve after said cup is placed against the eye.

4. A surgical device according to claim 2 wherein pressure measuring means is in communication with said vacuum chamber means for the measurement of the vacuum therein.

5. A device for optical use comprising:
   a plurality of suction cups compatible with the libal area of the eye,
   a plurality of suction chambers each operatively communicating with a respective one of said plurality of suction cups for the establishment of a vacuum therein,
   a plurality of shut-off valves each adapted to communicate with and selectively terminate a respective one of said plurality of said suction chambers,
   a vacuum chamber in communication with said plurality of shut-off valves and said plurality of suction chambers to selectively establish individual vacuums therewithin,
   a vacuum lock valve in communication with said vacuum chamber for the selective termination of said vacuum chamber,
   a vacuum control valve operatively communicating with said vacuum chamber for the establishment of a vacuum reservoir between said vacuum control valve and said vacuum lock valve,
   a bleed valve adapted to communicate with said vacuum chamber between said plurality of shut-off valves and said vacuum control valve to selectively dissipate the vacuum within said vacuum chamber, and
   a vacuum generator communicating with said vacuum lock valve and said vacuum chamber for the selective establishment of a vacuum therewithin,
   whereby a vacuum may be generated and controlled in said vacuum chamber means by said vacuum generation means while said shut-off valves are closed and at least part of said controlled vacuum may be transmitted through said individual suction chambers to each eye by opening each of said shut-off valves after said cups are placed against the eyes.

6. A device for optical use according to claim 5 including a pressure gage communicating with said vacuum chamber.

7. The method of treating the eye which comprises placing a cup having an opening adapted to fit the exterior surface of the eye eccentrically on the cornea so that the cup partly covers the cornea and partly covers the sclera and covers also a portion of the episclera, and applying suction to said cup thereby to increase the intraocular pressure and force aqueous from the interior of the eyeball through said episcleral area and into said cup.

8. The process described in claim 7 wherein a channel has previously been made surgically in the corneo-scleral limbus and is covered by a filtering bleb of the conjunctiva, said cup is placed over said channel and said bleb, thereby to stimulate the flow of aqueous through the channel into said bleb.

9. The method of treating the eye which comprises applying a cup perilimbally to the eyeball, said cup having an exterior portion adapted to fit said perilimbal surface, said eye having previously formed therein a channel through the corneo-scleral limbus and a filtering bleb in the subconjunctival space communicating with said channel, said cup being so placed that said exterior portion thereof presses against said bled, and applying suction to said cup to depress said bleb and restrict the flow of aqueous through said bleb from the interior of the eyeball, thereby to cause the cornea to bulge outwardly.

10. The method of treating the eye which comprises placing a cup over the eye, said cup having an exterior surface adapted to fit the exterior portion of the eye, said cup being placed perilimbally over the eye so that external portions of the cup contact the perilimbal portions of the eye to form a tight seal therewith, placing medication in said cup and applying suction to said cup while said medication is therein and said cup is in contact with the eye, thereby to increase the pressure of aqueous within the eyeball and promote the transfer of at least part of said medicament into the eyeball by diffusion through the cornea.

11. The method of measuring the pressure within the central retinal artery which comprises placing over the cornea a transparent cup having on one side a surface adapted to fit the exterior of the eyeball and having on the other side a substantially optically flat surface, said cup also having a tube and channel communicating with a suction-producing device, producing a partial vacuum within said cup in contact with the eyeball, increasing the amount of said vacuum thereby to cause the intraocular pressure to rise, observing the central retinal artery at the optic disc through said planar surface and said cup, and observing the point at which pulsations within the artery cease, thereby to measure the central retinal artery pressure.

12. An ocular cup formed of transparent material and having an interior chamber communicating with a side arm and channel therein to permit the application of partial vacuum, said cup having a substantially circular portion adapted to contact and fit tightly against the eyeball, and on the side opposite said contacting portion a substantially optically flat surface, an optical system for substantially unobstructed and unrefracted light rays passing from the interior of the eye through said cup and said flat surface while said cup is placed on the eye.

References Cited by the Examiner

UNITED STATES PATENTS

| | | | |
|---|---|---|---|
| 841,146 | 1/1907 | Hasbrouck | 128—40 |
| 2,035,664 | 3/1936 | O'Gorden | 128—25 |
| 2,626,606 | 1/1953 | Campbell | 128—249 |
| 2,767,711 | 10/1956 | Ernst | 128—249 |

FOREIGN PATENTS 1,933   8/1855   Great Britain.

RICHARD A. GAUDET, *Primary Examiner.*

SIMON BRODER, *Examiner.*